US006233873B1

(12) United States Patent
Lawrie et al.

(10) Patent No.: US 6,233,873 B1
(45) Date of Patent: May 22, 2001

(54) DEVICE FOR SUPPORTING A WINDOW ON A VEHICLE DOOR WINDOW LIFT

(75) Inventors: Mark Lawrie, Lion en Sullias; Jean luc Tourte, Briare, both of (FR)

(73) Assignee: Meritor Light Vehicle Systems (FR)

( * ) Notice: Subject to any disclaimer, the term of this patent is extended or adjusted under 35 U.S.C. 154(b) by 0 days.

(21) Appl. No.: 09/445,916

(22) PCT Filed: Apr. 29, 1999

(86) PCT No.: PCT/FR99/01027

§ 371 Date: Dec. 14, 1999

§ 102(e) Date: Dec. 14, 1999

(87) PCT Pub. No.: WO99/55994

PCT Pub. Date: Nov. 4, 1999

(30) Foreign Application Priority Data

Apr. 29, 1998 (FR) ........................ 98 05412

(51) Int. Cl.[7] ........................ B60J 1/00

(52) U.S. Cl. ........................ 49/375

(58) Field of Search ........................ 49/374, 375, 501, 49/348, 349, 352

(56) References Cited

U.S. PATENT DOCUMENTS 4,910,917 3/1990 Brauer .
5,243,785 * 9/1993 Nieboer et al. ........................ 49/375
6,041,549 * 3/2000 Schust et al. ........................ 49/375

FOREIGN PATENT DOCUMENTS 2836038 8/1978 (DE) .
0721044A1 10/1996 (FR) .
2099897A 12/1982 (GB) .
WO 9737099 10/1997 (WO) .
WO 9955994 11/1999 (WO) .

* cited by examiner

*Primary Examiner*—Jerry Redman
(74) *Attorney, Agent, or Firm*—Carlson, Gaskey & Olds, PC

(57) ABSTRACT

This device comprises at least one clamp (7) with two jaws (8) for gripping the window (2), these jaws being designed to grip the lower edge (2a) of this window, a back plate (9) laterally extending from one jaw approximately in the plane thereof, a slider (6) which is shaped so that it can slide on a window lifter guide rail, and a fastener for securing the slider and the back plate; formed in the slider is a recess (14) designed to take the back plate (9), the back plate has lateral tabs (16, 17) designed to to slide as far as an abutment position along retaining ramps (18, 19) formed in the slider to the side of the recess, and an elastic tongue and opening (26, 27) are provided for locking the back plate in its position in abutment on the slider. This device is easy to assemble and takes up a small amount of space in the transverse direction.

7 Claims, 3 Drawing Sheets

DEVICE FOR SUPPORTING A WINDOW ON A VEHICLE DOOR WINDOW LIFT

BACKGROUND OF THE INVENTION

The present invention relates to a device for supporting a window in a vehicle door window lifter, comprising at least one clamp with two jaws for gripping the window, these jaws being designed to grip the lower edge of the window, a back plate laterally extending from one jaw approximately in the plane thereof, a slider which is shaped so that it can slide on a window lifter guide rail, and means for securing the slider and the back plate.

SUMMARY OF THE INVENTION

In a preferred embodiment, the window lifter comprises two guide rails, each having one window support device associated with it.

The object of the invention is to provide a window support device in which it is easy to assemble the back plate and the slider and which takes up a small amount of space in the transverse direction.

According to the invention, the window support device is characterized in that formed in the slider is a recess designed to receive the back plate, and in that the back plate has lateral tabs designed to slide as far as an abutment position along retaining ramps in the slider formed to the side of the recess, and in that means are provided for locking the back plate in its position in abutment on the slider.

The back plate and the slider are therefore assembled by first pushing the back plate into its initial position on the slider, then by making it slide in the recess of this slider until its lateral tabs, sliding under the attachment ramps of the slider, come into abutment.

According to one embodiment of the invention, the slider has a central aperture in which there is a member for locking the back plate, the edges of the recess are each provided with at least one ramp under which an associated tab of the back plate can engage and slide, and this ramp is extended by a transverse end stop for the tab.

Other features and advantages of the invention will appear during the description given below, made with reference to the appended drawings which illustrate two embodiments thereof by way of non-limiting example.

DETAILED DESCRIPTION OF THE PREFERRED EMBODIMENT

Figure 1:
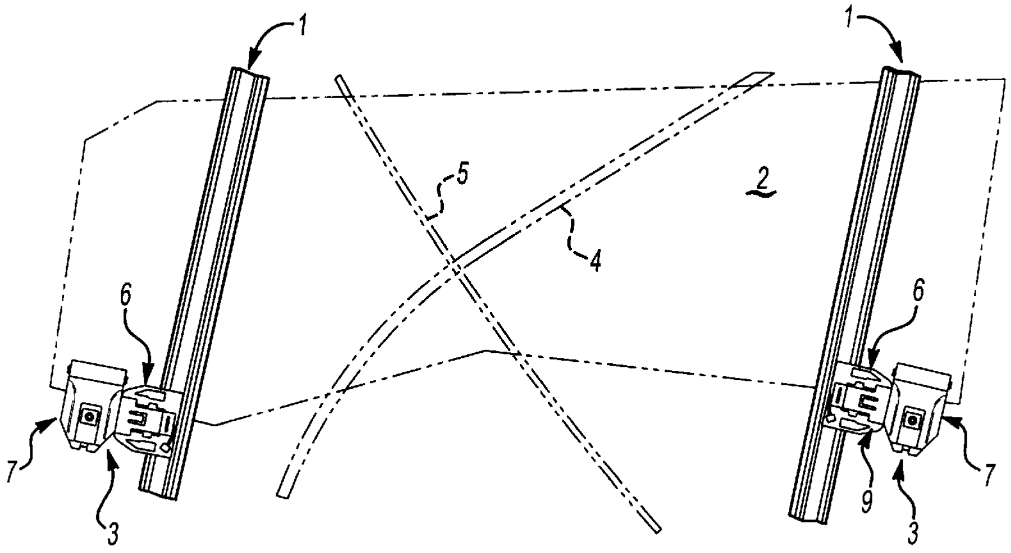
FIG. 1 is a partial view in elevation of a vehicle door window lifter with two guide rails and cables for driving the window, each equipped with a window support device in accordance with the invention.
Figure 2:
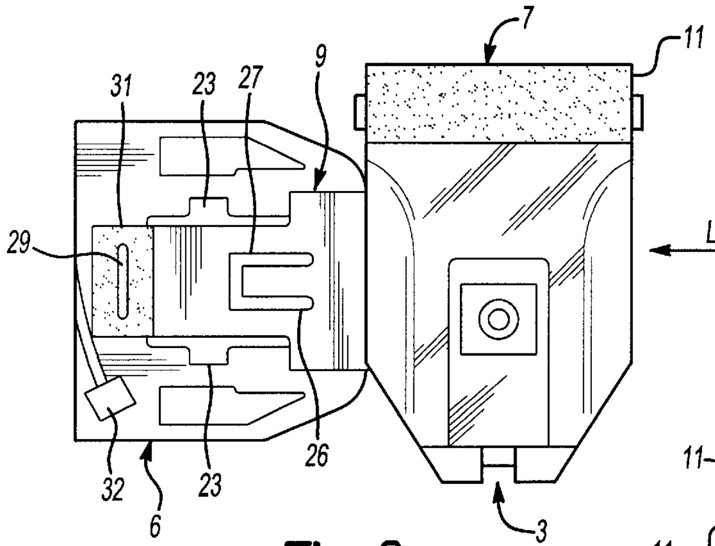
FIG. 2 is a view in side elevation, in a larger scale, of one of the window support devices of FIG. 1.

The window lifter partially depicted in FIG. 1 comprises two rails 1 for guiding the movement of a window 2 on two devices 3 for supporting this window along the rails 1, these being arranged parallel to one another in an approximately vertical plane.

This window lifter, which is intended to be fitted to a vehicle door, not depicted, comprises, two cables 4, 5 for driving a slider 6 of each support device 3, as known. The window lifter is supplemented by a motor for driving the cables 4, 5 and by cable-return members located at the ends of the rails 1, these elements being known in the art and not depicted.

Each device 3 for supporting the window 2 comprises a clamp 7 with two jaws 8 for gripping the window 2, these jaws being designed to grip the lower edge 2*a* of the window 2. A back plate 9 laterally extends from one jaw 8 approximately in the plane thereof, and the corresponding slider 6 has a slot 33 (FIG. 5) in which a complementary element of the rail 1 can be gripped. Also made in the slider 6 is a housing 32 which takes an end termination for securing the corresponding drive cable 4, 5.

Figure 3:
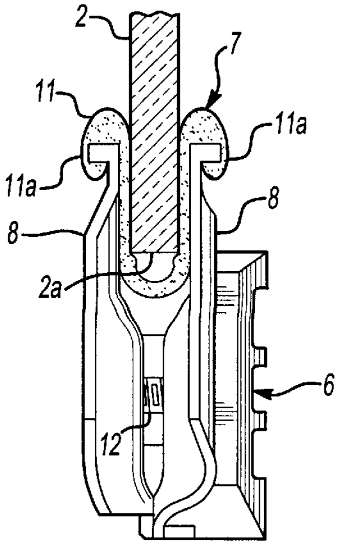
FIG. 3 is a view in cross section in the direction L of FIG. 2.
Figure 5:
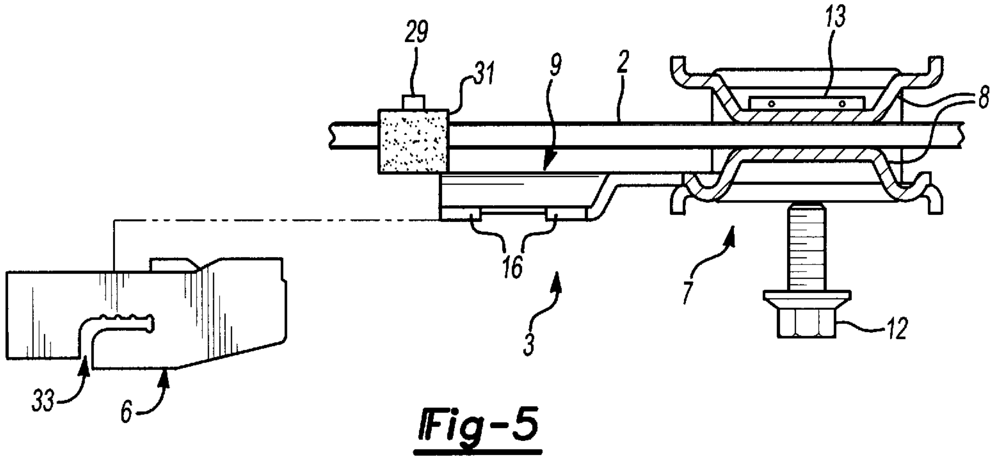
FIG. 5 is a view from beneath in the direction of arrow K of FIG. 4.

Introduced between the two jaws 8 is a flexible U-section 11, the edges 11*a* of which are caught on the upper ends of the jaws 8, and in which the lower edge 2*a* of the window 2 is inserted (FIG. 3). The jaws 8 are made and assembled in a way known in the art, using a bolt 12 passing through the two jaws 8 and held in place by a nut 13 (FIG. 5).

According to the arrangement illustrated in FIG. 1, the device 3 for supporting the front of the window 2 (the left-hand device) is mounted in such a way that the clamp 7 is located forward of the rail 1, whereas the rear device 3 has its clamp 7 located to the rear of the corresponding rail 1. Furthermore, bearing in mind the inclination of the rails 1 and of the clamps 7 to the vertical, the lower edge 2*a* of the window 2 has a discontinuous shape, designed so that its portions inserted in the clamps 7 bear uniformly on these clamps across their entire width.

Each slider 6 has a recess 14 designed to take the associated back plate 9. In the embodiment illustrated in the drawings, the recess 14 opens into a hole 15 passing right through the slider 6. The back plate 9 has lateral tabs (16, 17), numbering two in this embodiment, on each side of the back plate. These tabs 16, 17 are designed to be able to slide along ramps 18, 19 for retaining the slider 6 on the back plate 9. The ramps 18, 19 are formed to the side of the recess 14, are oriented towards the inside of the slider in the hole 15, and extend, on the opposite side to the clamp 7, in the form of transverse shoulders 21, 22. The latter are designed to act as end stops for the tabs 16, 17 after these have been pushed into the recess 14 and the back plate 9 has slid into its position of abutment in the slider 6, as will be explained in greater detail later.

Figure 6:
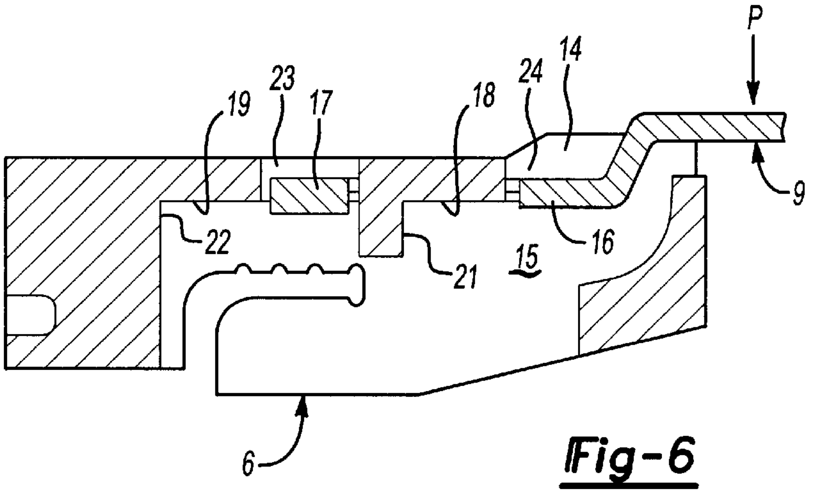
FIG. 6 is a view in part section of the slider and of the back plate showing the position of the back plate as it starts to be assembled with the slider, before it slides therein.

Between the stop shoulders 21, 22, the recess 14 defines an opening 23 for the introduction of the tab 17, while the tab 16 can be fitted through a hole 24 made in front of the ramp 18 (FIG. 6). Each slider 6 also has a central aperture 25, in which there is a member 26 for locking the back plate 9, this member consisting, in the example described, of an elastic tongue extending in the direction F of sliding of the back plate 9 on the slider 6. Its free end 26*a* is located at the opposite side to the clamp 7 and to the back plate 9 and is shaped in such a way that it projects from the plane of contact with the back plate 9.

Correspondingly, the back plate 9 has a central opening 27 into which the free end 26*a* of the flexible tongue 27 can clip elastically and fulfil its function of locking the back plate 9 on the slider 6, at the end of the sliding travel of the back plate 9 in the slider 6.

The back plate 9 has a generally U-shaped cross section, with the tabs 16, 17 arranged one behind the other on its opposite edges 28. The end 29 of each back plate 9 is bent at right angles to the overall plane of the back plate 9 on the inside of the clamp 7 and carries a flexible pad 31. The latter is made of the same substance of the section piece 11 and the lower edge 2*a* of the window 2 can rest against it.

A clamp 7 and its back plate 9 are assembled with the associated slider 6 as follows.

Figure 4:
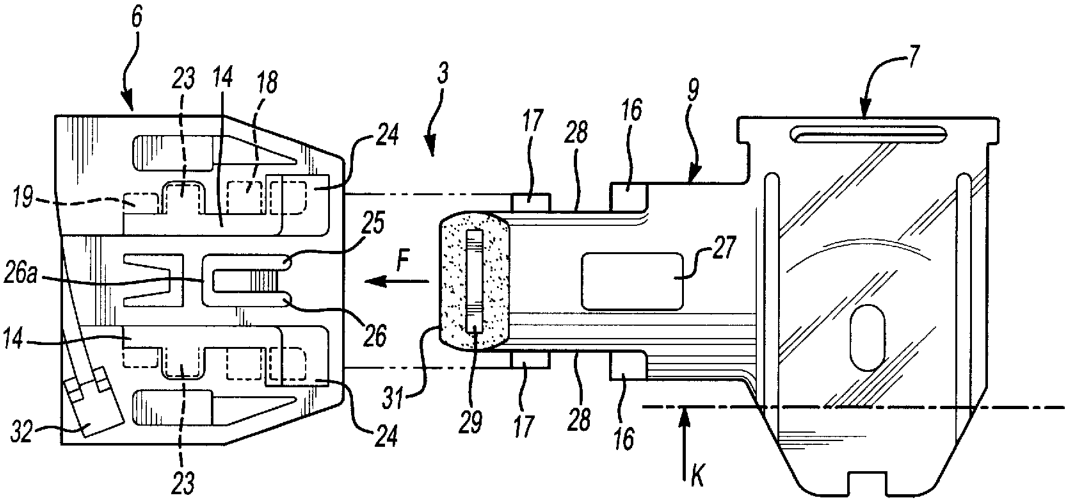
FIG. 4 is a view in side elevation, to scale, of the clamp with its back plate, and of the slider of FIGS. 2 and 3, prior to assembly.

Starting out from the separated position of FIGS. 4 and 5, the operator places the back plate 9 in the recess 14 in the slider 6 in such a way that the two pairs of tabs 16, 17 become housed respectively in the holes 24 and 23 (FIG. 6) facing the respective ramps 18, 19.

The operator then exerts pressure P on the back plate 9 so as to push it far enough into the recess 14 against the opposing elastic force of the flexible tongue 26, until the tabs 16, 17 are placed under the ramps 18, 19.

Figure 7:
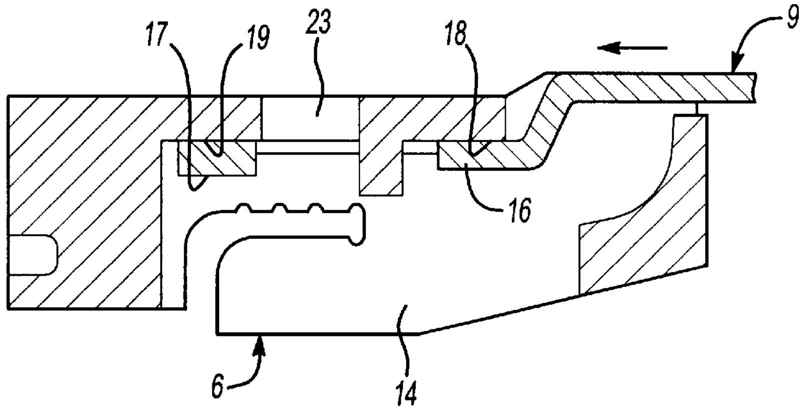
FIG. 7 is a view in part section similar to FIG. 6, showing the position of the back plate at the end of sliding in the slider.

As soon as this back plate has been pushed in far enough, the operator needs merely to slide the back plate 9 as shown by the arrow in FIG. 7 to make the tabs 16, 17 slide along the respective ramps 18, 19 until they come into a position of abutment against the corresponding stop shoulders 21 and 22. At the end of the travel of the back plate 9, the free end 26*a* of the tongue 26, which hitherto had been flexed under the central part of the back plate 9, is abruptly released and relaxes elastically to engage in the opening 27. This snap-fastening locks the back plate 9 onto the slider 6.

From that moment on, the back plate 9 can no longer be detached from the slider 6 other than by exerting on the tongue 26 a force which is strong enough to cause it to flex in order to make its free end 26*a* move back below the internal surface of the back plate 9.

This assembly operation is very simple and can be performed without difficulty.

Figure 8:
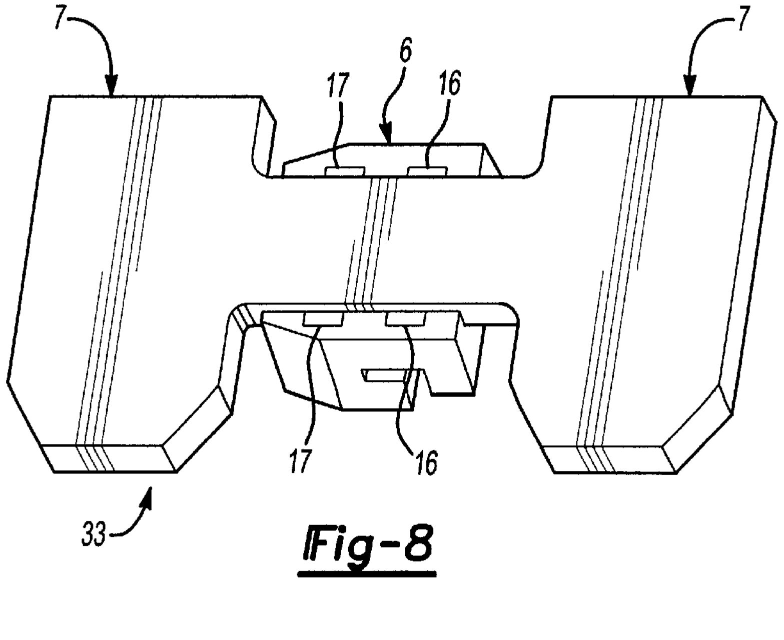
FIG. 8 is a simplified perspective view of a second embodiment of the support device according to the invention.

According to a second embodiment illustrated in FIG. 8, the support device 33 comprises two clamps 7, connected by a back plate 34 equipped with two pairs of lateral tabs 16, 17 and a slider 6. This device offers the window 2 twice the supported length of the previous embodiment.

The invention is not restricted to the embodiments described and may have embodiment variations. Thus, each back plate 9 could have just one suitably sized lateral tab engaging under a corresponding retaining ramp formed in the slider 6. Likewise, the locking tongue 26 may be replaced by any equivalent element.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A device for supporting a window in a vehicle door window lifter, comprising at least one clamp with two jaws for gripping a window, the jaws being designed to fit under a lower edge of the window, a back plate laterally extending from one jaw approximately in the plane thereof, a slider which is shaped so that it can slide on a window lifter guide rail, said slider being secured to said back plate, the device being characterized in that formed in the slider is a recess designed to receive the back plate, and in that the back plate has lateral tabs designed to be able to slide as far as an abutment position along retaining ramps formed in the slider to the side of the recess, the back plate locked in its position in abutment with the slider.

2. A device according to claim 1, characterized in that the slider has a central aperture in which there is a member for locking the back plate, the edges of the recess are each provided with at least one ramp under which an associated tab of the back plate can engage and slide, and in that this ramp is extended by a transverse end stop for the tab.

3. A device according to claim 2, characterized in that the central locking member is an elastic tongue of the slider, extending in the direction of sliding of the back plate on the slider, insider the aperture of the slider, facing a corresponding opening in the back plate, with a free end of the tongue at the opposite end to the back plate, the tongue and the opening being shaped in such a way that insertion of the back plate into the recess in the slider causes the flexing of the free end of the tongue which can then slide along the back plate as the back plate slides on the slider, until the free end clips elastically into the opening when the tabs of the back plate reach abutment.

4. A device according to claim 3, characterized in that the back plate has an approximately U-shaped cross section, with the tabs arranged on edges of the back plate.

5. A device according to claim 1, characterized in that it comprises two clamps connected by a back plate equipped with lateral tabs for fastening to the slider.

6. A window lifter system comprising a pair of rails for guiding the movement of a window, a slider which is shaped so that it can slide on a window lifter guide rail, a window support device for supporting a window in a vehicle door window lifter, having at least one clamp with two jaws for gripping a window, the jaws being designed to fit under a lower edge of the window, a back plate laterally extending from one jaw approximately in the plane thereof, said slider being secured to said back plate, the system being characterized in that formed in the slider is a recess designed to receive the back plate, and in that the back plate has lateral tabs designed to be able to slide as far as an abutment position along retaining ramps formed in the slider to the side of the recess, said back plate locked in its position in abutment with the slider.

7. A window lifter system comprising a window and a pair of rails for guiding the movement of the window, a slider which is shaped so that it can slide on a window lifter guide rail, a window support device for supporting the window in a vehicle door window lifter, having at least one clamp with two jaws for gripping the window, the jaws being designed to fit under a lower edge of the window, a back plate laterally extending from one jaw approximately in the plane thereof, said slider being secured to said back plate, the system being characterized in that formed in the slider is a recess designed to receive the back plate, and in that the back plate has lateral tabs designed to be able to slide as far as an abutment position along retaining ramps formed in the slider to the side of the recess, said back plate locked in its position in abutment with the slider.

* * * * *